United States Patent Office 3,566,446
Patented Mar. 2, 1971

3,566,446
MOLD SIMULATOR
George R. Smoluk, Cincinnati, Ohio, assignor to
Cincinnati Milacron Inc., Cincinnati, Ohio
Filed Feb. 5, 1969, Ser. No. 796,724
Int. Cl. B29f 1/00
U.S. Cl. 18—30    10 Claims

ABSTRACT OF THE DISCLOSURE

An apparatus to stimulate the behavior of a large number of various injection molding machine molds the behavior of which can be reduced to a program of pressure variation in combination with a variety of flow duration situations.

BACKGROUND OF THE INVENTION

This invention relates to mold simulators for use in the testing of injection molding machines, particularly the reciprocating screw or plunger type machines suitable for the injection molding of plastic and elastomeric materials. The current practice for evaluating the performance of a plastics injection molding machine in most cases simply consists of operating the machine with suitable molds for a variety of plastic parts in a trial-and-error fashion and simply noting that the machine will or will not run a certain mold or that it was easy or difficult to fill the mold with the machine in question, etc. Usually in such trials, very little quantitative information regarding the reaction of the machine to this variety of molding conditions is obtained because of the difficulty in determining how one mold differs from another in a measureable fashion. However, although it is difficult to know how actual molds differ from one to another in a quantitative fashion, a reasonably simple analysis indicates how they must differ from one another in so far as the injection machine "sees" them through its only connection with such molds, namely the nozzle of the injection cylinder. In the final analysis, the only thing the injection machine "sees" when it is connected to a mold through its nozzle and asked to fill the mold is some program on a time scale of decreasing and/or increasing pressure during its filling stroke for a varying duration of total elapsed injection time depending on the injection rate set on the machine and the total volume to be filled in the mold under test. Thus, if some device could be connected to the end of the injection machine nozzle which would vary the resistance to the escape of melt form the nozzle in a known and predetermined fashion and which could shut the flow from the nozzle off after some predetermined volume of material has been delivered, then as far as the inanimate, unthinking injection machine is concerned, it would not "know" whether it was connected to an actual mold or this other type of device.

With this in mind it is easy to see that a definite need exists for a single device or mold simulator in which a large variety of such conditions could be produced, which simulator would in effect simulate the behavior of a large, if not indefinite, number of various molds. A major benefit of the mold simulator is that it permits one to use a single mold rather than requiring the use of several tools to evaluate the performance of an injection machine, thus greatly lowering the cost of such trials and increasing the convenience with which they may be carried out. Another advantage of such a mold simulator is that it can be arranged to provide quantitative data regarding the performance or injection machines and lead to a more complete understanding of the fundamental injection process itself, thus enabling designers to more confidently design injection equipment. Still another advantage of the simulator is that while gathering such quantitative information about the injection machine it may be used simultaneously to provide quantitative information about the injection molding behavior at a large variety of plastic materials which may be used in conjunction with the simulator. Most valuable is the probable ability of such a mold simulator to describe real differences between injection machines to explain why a given mold will run efficiently in one and not another machine of similar construction and capacity. In addition to the above, the comparison of response of injection machines to known loading conditions produced by the mold simulator and the response of this same machine to actual molds run under the same conditions should lead to a better understanding of how features in a mold change its operating characteristics in an injection molding machine.

SUMMARY OF THE INVENTION

An apparatus for quantatively studying the capability and performance of the injection means of an injection molding machine comprising a mold simulator for mounting between the platens of an injection molding machine, wherein shots of plasticized material are injected through a nozzle against a movable displacement member within a chamber thereby producing a variable volume mold cavity, with the relative movement between the displacement member and the chamber being opposed by fluid pressure within the chamber, the escape of fluid therefrom being regulated by a flow control valve as a function of the relative movement between the displacement member and the chamber with the pressure within a chamber, the position and velocity between the displacement member and the chamber and the temperature of the injected material, all being simultaneously measured and recorded for comparison with the similar variables of the injection means.

BRIEF DRAWING DESCRIPTION

FIG. 4 is a fragmentary top view looking in the direction of arrow 4 in FIG. 1.

DETAILED DESCRIPTION

Figure 1:
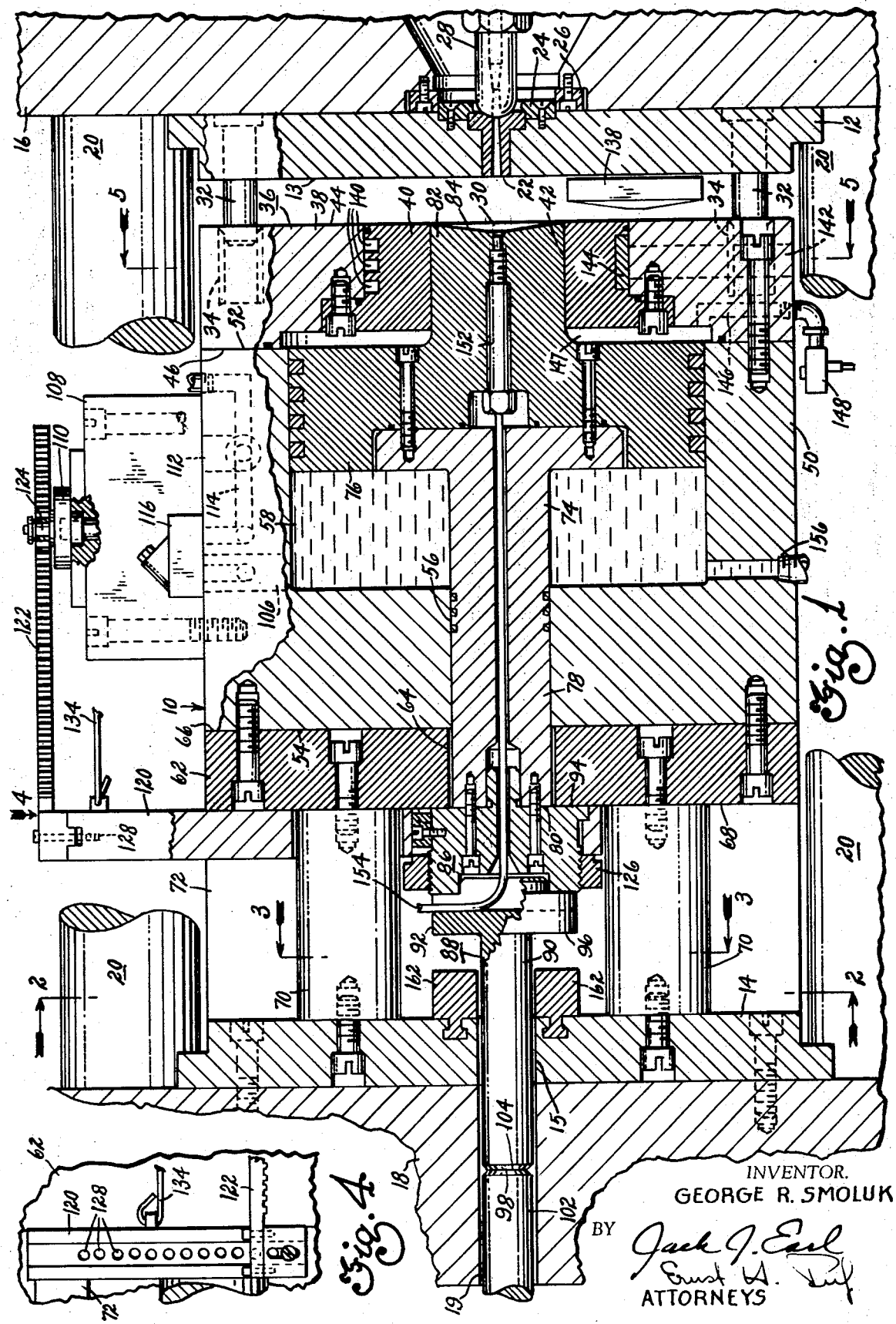
FIG. 1 is a longitudinal sectional view, partly in elevation, of a mold simulator installed between the platens of an injection molding machine.

Referring now to the drawings in detail, FIG. 1, which depicts the mold simulator in the open position just after ejecting a molded slug of plastics, shows the mold simulator, generally designated by numeral 10, attached by its sprue plate 12 and backup plate 14 to fixed platen 16 and moving platen 18 respectively of an injection molding machine, with platens 16 and 18 being journaled and supported on four tie bars 20. Sprue plate 12, having rear face 13, serves to support sprue bushing 22 which is held in the former by means of sprue bushing retainer ring 24, with the latter in turn being centered on fixed platen 16 by screw locating ring 26 fastened to fixed platen 16. Mating with sprue bushing 22 is nozzle 28 of an injection system 29 (see FIG. 6), for forcing shots of plasticized material through sprue bushing 22 into the variable volume mold cavity 30 (to be described later).

Movingly attached to sprue plate 16, by guide pins 32 slideable in guide bushings 34, is annular mold cavity plate 36 composed of apertured plate 38 having front and rear faces 44 and 46 respectively, and annular mold cavity block 40 having central opening 42.

Figures 2, 3:
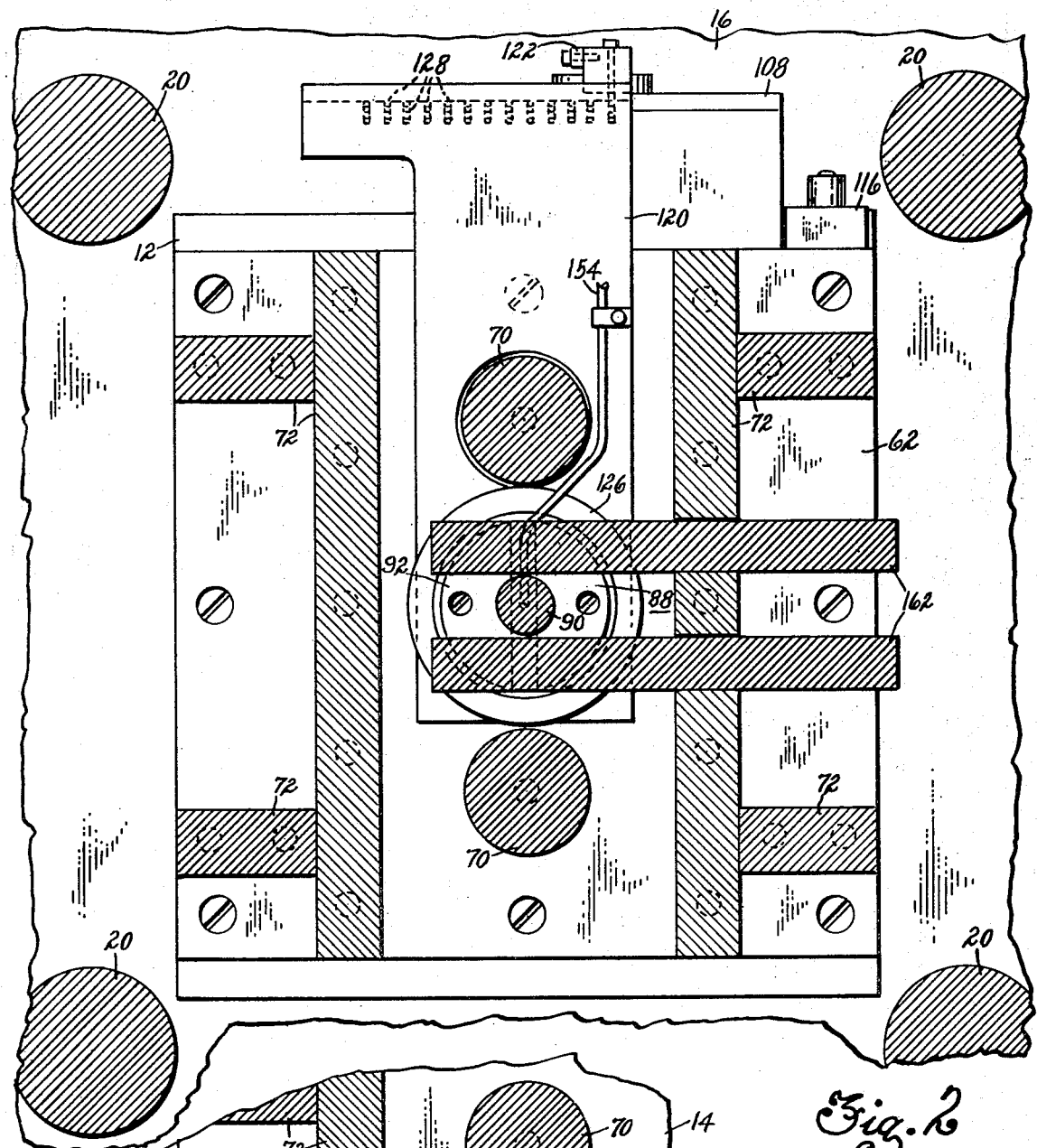
FIG. 2 is a sectional view taken in the direction of arrows 2—2 in FIG. 1.
FIG. 3 is a fragmentary sectional view taken in the direction of arrows 3—3 in FIG. 1.

Sealingly attached to mold cavity plate stepped rear face 46 is open end 52 of a chamber such as cylinder 50 also having cylinder bore 58 and apertured end 54 with central aperture 56. Matingly attached to apertured end 54 is support plate 62 having central aperture 64 (coaxial with central aperture 56, and front and rear faces 66 and 68, respectively. Attached to support plate 62 are the first ends of two identical equally spaced support members or pillars 70 which in turn have their second ends attached to backup plate 14. As shown in FIGS. 2 and 3, also interposed between and attached to support plate 62 and backup plate 14 are rectangular support plates 72.

Confined within and sealingly, but movingly, mating with cylinder bore 58 is stepped central portion 76 of a displacement member such as movable stepped piston assembly 74 also having first end portion 78 with end face 80 received within and sealingly, but movingly, mating with cylinder central aperture 56 through support plate central aperture 64. Piston second end portion 82, having slightly concave end face 84, sealingly, but movingly, extends into, and in one position, (FIG. 1) is capable of substantially completely filling mold cavity plate central opening 42.

Attached to piston first end portion 78 is piston extension 88 composed of rod portion 90, having flange portion 92 with rear face 96, and spacer 86, having front face 94 abutting end face 80 of piston first end portion 78.

Piston extension rod portion 90 extends through aperture 15 in backup plate 14 and into aperture 19 in moving platen 18 wherein its end face 98 in one position (FIG. 1) is capable of abutting end face 104 of fixed knock-out pin 102.

Sprue bushing 22 of simulator 10 serves to conduct the molten plastic, plasticized material or melt issuing from the nozzle 28 of the injection means to the variable volume cavity 30 of the mold simulator which is formed by mold cavity block central opening 42 and piston second end portion 82, the end face 84 of which forms the bottom of the mold cavity. Sprue plate 12 and sprue bushing 22 serve to form the top of cavity 30 when the mold simulator is in the closed position (see FIG. 6) and to seal off variable volume cavity 30 during injection portion of the test cycle; with cavity 30 having essentially zero volume at the start of the injection cycle.

As plasticized material from the injection means enters the mold simulator (when the latter is in the closed position) it forces stepped piston assembly 74 to the left, thus forming mold cavity 30 while simultaneously filling it. At the same time the leftward motion of the stepped portion 76 of stepped piston assembly 74 is opposed by a force created by controlling the escape of hydraulic fluid from cylinder bore 58.

A port of channel 106 is machined in cylinder 50 to connect cylinder bore 58 to an adjustable flow control valve 108 having a control member 110, such as for example an orifice mounted thereon. During movement of piston assembly 74 from right to left (FIG. 6), adjustable flow control valve 108 controls the resistance to flow of fluid such as hydraulic fluid from cylinder bore 58 through valve 108 and through a subsequent port 112, also machined in cylinder 50, to a fluid reservoir 60 mounted remotely (see FIG. 6) above mold simulator 10. A further system of channels 114 also machined into cylinder 50 in cooperation with a check valve 116 mounted thereon and in conjunction with channels 106 and 112 allows the free flow of hydraulic fluid into cylinder bore 58 when stepped piston assembly 74 is moving from left to right (see FIG. 6).

Figure 5:
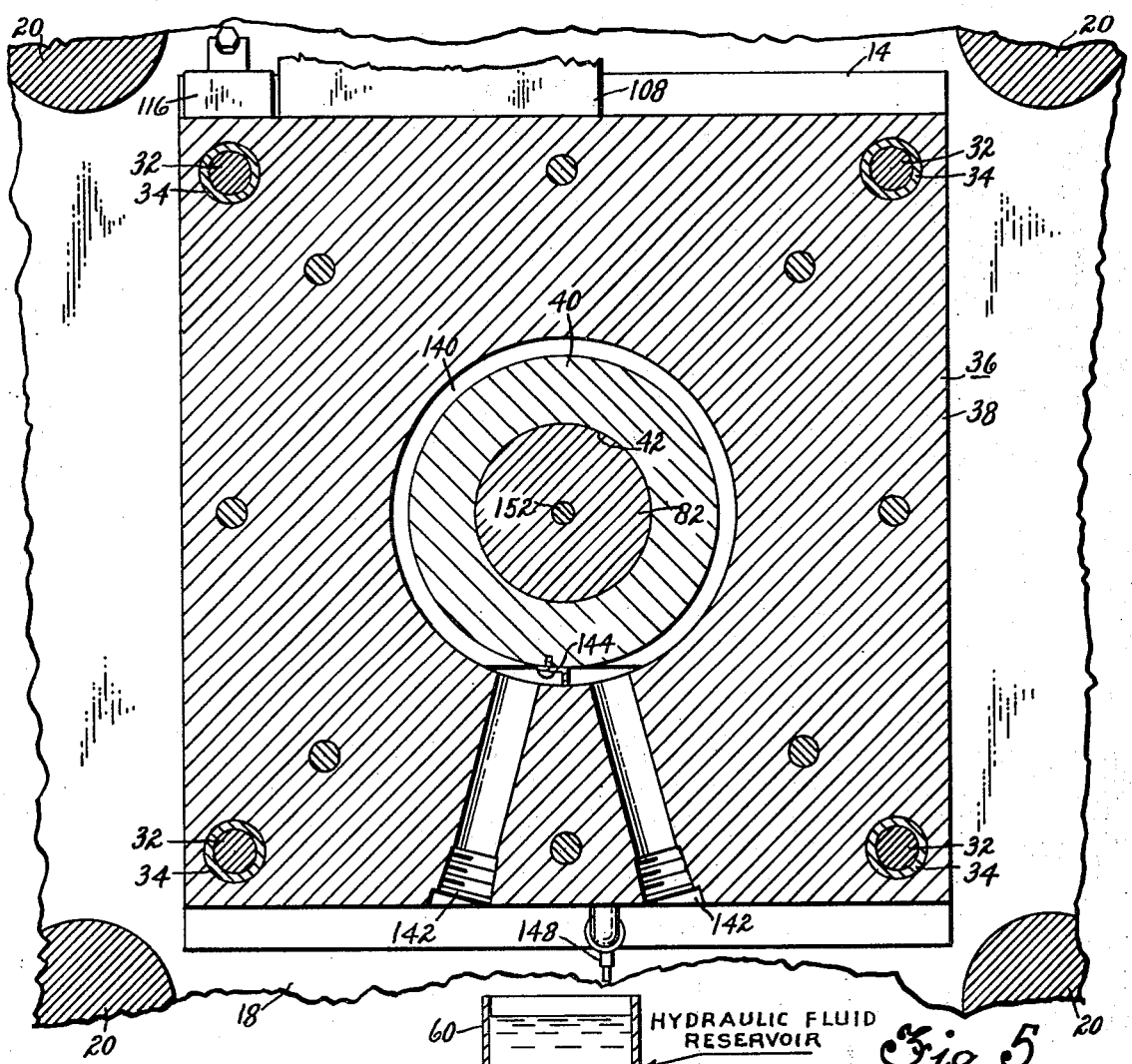
FIG. 5 is a fragmentary sectional view taken in the direction of arrows 5—5 in FIG. 1.

In order to cool the molten and hot plastic slug 138 so that it may be ejected from mold cavity 30 in the solid phase, as shown in FIG. 1, a plurality of cooling fluid channels 140 are formed by grooves in mold cavity block 40. Fluid connection channels 142 contained in mold cavity plate 38 admit coolant fluid to cooling channels 140 and baffle plate 144 therein serves to separate inlet and outlet fluid connections to insure circumferential circulation of the coolant around mold cavity 30 (see FIG. 5).

Mold cavity plate 38 also contains a passage 146 which allows air to escape from chamber 147 formed between piston assembly stepped portion 76 and mold cavity plate stepped rear face 46 while stepped piston assembly 74 is moving from left to right (FIG. 1) on the ejection stroke of the simulator. To prevent piston assembly 74 from moving too fast and possibly damaging the simulator, an adjustable bleeder valve 148 is used to throttle the escape of air to a safe level.

As previously stated, the flow of plasticized material into mold simulator 10 can be controlled in a programmed fashion by controlling the escape of hydraulic fluid from cylinder bore 58 by using flow control valve 108. So that the resistance to mold filling may be recorded in a quantitative fashion, cylinder bore 58 is also provided with a pressure transducer connection 156. A mating pressure transducer 158 (see FIG. 6) measure the pressure in the hydraulic fluid during the filling of variable volume cavity 30 and sends a signal to recorder 132, where the pressure and its fluctuation is recorded as a function of time.

Stepped piston assembly 74 has a hole drilled through its central axis to permit the installation of a temperature sensor 152 in such a manner that its junction is in direct contact with the impinging melt coming from injection nozzle 28 through sprue bushing 22; with the right cylindrical end of temperature sensor 152 being fitted flush with end face 84 of piston second end portion 82. A cable 154 transmits the signal from thermocouple 152 to remote recorder 132 (see FIG. 6) where the temperature of the melt is recorded on the same time scale as the hydraulic fluid pressure in the simulator.

In addition, mold simulator 10 is also equipped with means for sensing the movement of stepped piston assembly 74 within simulator 10 so that the rate at which the melt enters simulator 10 may also be recorded. This is accomplished by mounting one end of actuating arm 120 on piston extension spacer 86 by means of a large nut 126. Actuating arm 120 is thereby free to reciprocate with piston assembly 74 and will in practice be connected to actuating cable 134 of a suitable combination position-velocity transducer 130 (see FIG. 6). Thus as piston assembly 74, within mold simulator 10, moves during the injection stroke of the machine, both its location and velocity at each position of its movement can be automatically recorded on recorder 132 on the same time scale as that used to record the hydraulic pressure and melt temperature existing in the simulator during an injection test.

Injection system 29 (FIGS. 6 and 7), which may be of any desired construction, utilizes any desired actuating means 31, such as for example a reciprocating-rotating screw or ram etc., for forcing shots of plasticized material through nozzle 28 into variable volume mold cavity 30. The melt and hydraulic injection pressures as well as the temperature of the material or melt in injection system 29 are measured upstream of nozzle 28 by pressure transducers 158a, 158b and temperature sensor 152a respectively and transmitted to recorder 132. Similarly, the position and velocity of injection system actuating means 31 are measured by position-velocity transducer 130a suitably connected to both injection system actuating means 31 and recorder 132.

Therefore, simulator 10 can be used to simultaneously measure and record (1a) the actual resistance (pressure) to flow being imposed on injection machine nozzle 28, (2a) the temperature of the melt issuing from nozzle 28 during the initial portion of the injection stroke, and (3a) the rate (motion; position and velocity) at which the injection system is able to fill cavity 30 under the resistance and temperature conditions produced thereby. The measurements of these variables (1a–3a) are then compared with: (1b) the melt and hydraulic injection pressures in the injection system 29; (2b) the temperature of the material or melt upstream of nozzle 28 (in injection system 29); and (3b) the position and velocity of the injection system actuating means 31; all of which are simultaneously measured and recorded on the same time scale with variables 1a–3a.

In addition to providing the means to actuate position-velocity transducer 130, actuating arm 120 in conjunction with rack 122 and pinion 124 constitutes an adjustable means which provides the driving force required to actuate flow control valve 108, which in turn provides the changing resistance to the escape of hydraulic fluid from the mold simulator i.e., cylinder bore 58, and hence the resistance to the flow of melt into the simulator mold cavity 30. Actuating arm 120, which extends upwardly parallel with support plate 62, has one end mounted on piston extension spacer 86 while its other end has a spaced series of threaded vertical holes 128 (as best seen in the FIGS. 2 and 4) which allow for the adjustable mounting of one end of rack 122 thereon. Rack 122, which extends slightly beyond flow control valve 108, operatively meshes with replaceable pinion 124 attached to control member 110 of adjustable flow control valve 108. Thus control member 110 may be traversed through any position from fully opened to fully closed during each injection stroke in accordance with the pinion and rack combination selected. Actuating arm 120 and rack 122 are so designed that the rack may be adjusted by means of holes 128 to operate in conjunction with a variety of pinions or gears 124 to allow the necessary motion to provide the desired flexibility for valve control member 110.

Further flexibility of valve resistance adjustment to the escape of hydraulic fluid from cylinder bore 58 may be provided by changing valve control member 110 to provide different valve characteristics. Thus, virtually any program of valve resistance can be produced by changing the rack and pinion combination and changing valve control member 110. In this way virtually any program of resistance to melt flow during an injection stroke can be created within mold simulator 10 to simulate the resistance to flow which an injection means might "see" through nozzle 28 in various molds which might be installed in the injection molding machine.

In addition to simulating the difference between small shots and large injection shots, the motion of stepped piston assembly 74 in mold simulator 10 may be positively stopped at any point in its travel by inserting one or more replaceable stop members 162 which limit the travel of piston assembly 74, regardless of the resistance to flow at that particular point in the cycle. It should be noted however that normally it would be preferable to stop the motion of stepped piston assembly 74 by closing off flow control valve 108 so that transducer 130 would continue to record the pressure in cylinder bore 58.

After an injection shot has been made into the mold simulator and sufficient time has elapsed to solidify the sample slug of plastic, the movement of moving platen 18 of the injection machine from right to left in FIG. 1 will open mold simulator 10 causing mold cavity plate 36 to separate from sprue plate 12. As the mold simulator assembly to the left of the separation continues to move to the left, piston extension rod portion 90 (which will have been separated from fixed knockout pin 102 while the mold simulator was closed) will seat on knockout pin 102 and cease moving while the remainder of the mold simulator continues to move to the left. This will cause stepped piston assembly 74 to advance from left to right with respect to mold cavity block 40, thus forcing molded piece or slug 138 to drop out of mold cavity 30 (which had previously existed due to the relative positions of mold cavity block 40 and piston second end portion 82) and returning the simulator to the position as shown in FIG. 1.

Thus it can be seen from FIG. 1 that by using the mold simulator in conjunction with the proper system of transducers and recording devices it is possible to make an injection shot under conditions of controlled resistance to flow while simultaneously measuring the actual resistance to flow presented, the temperature of the entering melt and the flow rate and flow pattern during the filling of the mold cavity under such temperature conditions and resistance to flow.

Figure 6:
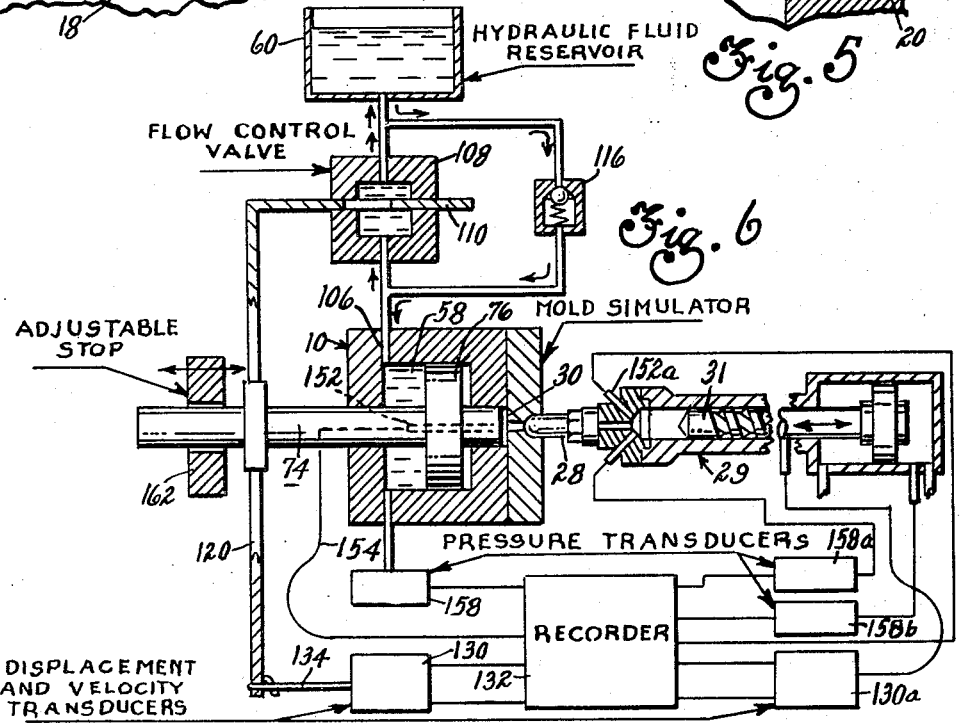
FIG. 6 is a schematic depicting mold simulator operation.

The operation of mold simulator 10 may be best understood with reference to the schematic diagram shown in FIG. 6. As plasticized material or melt enters the mold simulator from right to left from injection machine nozzle 28 it forces stepped piston assembly 74 to move to the left thus increasing the volume of mold cavity 30 from essentially zero at the start of the filling motion to a volume equivalent to the plastic injected.

As the melt pushes stepped piston assembly 74 to the left (FIG. 6) the hydraulic fluid in cylinder bore 58 is forced out therefrom against the increasing resistance to the fluid's escape presented by flow control valve 108, which is closed according to a predetermined program by rack 122 meshing with replaceable pinion 124 in accordance with the motion of stepped piston assembly 74 to the left as cavity 30 is filling. By properly controlling the travel of control member or orifice 110 in control valve 108 and the shape of orifice 108 (or the valve's characteristic) it is possible to produce virtually any program of valve resistance (and hence pressure within the mold simulator to resist the movement of stepped piston assembly 74) as a function of the position of stepped piston assembly 74 during the injection stroke of the injection means.

Thus it is possible to oppose the flow of melt into mold cavity 30 with almost any program of opposing pressure desired by properly modifying the characteristics of flow control valve 108 and controlling its travel proportional to the travel of stepped piston assembly 74. For example, flow control valve 108 may be adjusted so as to become completely closed within one half of the full stroke available to stepped piston assembly 74 inside the simulator. It may also be adjusted to provide a linear or nonlinear decrease in flow rate through valve 108, while it is closing by changing control member 110, such as for example, an orifice or spool, in valve 108. In such a case, stepped piston assembly 74 would come to rest on the cushion of trapped hydraulic fluid within cylinder bore 58 under such conditions when the pressure in the hydraulic fluid equalled the pressure exerted by the incoming melt.

Another way of operating the simulator is to stop the travel of stepped piston assembly 74 by means of one or more stop members 162, for example, replaceable mechanical stops of differing thicknesses (depending on the length of travel desired), interposed between backup plate 14 and rear face 96 of piston extension flange portion 92, at any point in the valve closing stroke from full open to full closed. However, it must be remembered that under such conditions it will not be possible to maintain static pressure within cylinder bore 58 and only the pressure developed during the filling of mold cavity 30 can be measured since the hydraulic fluid pressure will decay through the still open valve 108 after piston extension flange portion 92 of stepped piston assembly 74 seats on adjustable stop members 162. It should be noted that in the previous example when valve 108 is used to cut off the escape of hydraulic fluid from cylinder bore 58 and hence the travel of stepped piston assembly 74, it is possible to continue monitoring the melt pressure after the travel of stepped piston assembly 74 has been arrested.

With the previously described method for limiting the stroke of stepped piston assembly 74 within mold simulator 10, i.e., by using stops 162, it is impossible to continue to measure the pressure within mold cavity 30 after stepped piston assembly 74 is stopped from moving if flow control valve 108 is still open since any pressure within piston bore 58 would be bled off to the hydraulic reservoir through the open valve. Such a condition would occur when trying to simulate a mold with a small volume and a low resistance to flow. In such a case the melt would stop moving before any appreciable resistance had been developed by virtue of freezing runners (not shown), etc.

To stimulate such a condition within mold simulator 10 and to continue to measure the mold cavity pressure, as transmitted to the hydraulic fluid behind the simulators piston, it becomes necessary to stop the travel of stepped piston assembly 74 by using a hydraulic cushion whose pressure could be measured continuously as movement of the mold cavity bottom, i.e., end face 84 of piston second end portion 82, is stopped. This may be accomplished by using cylinder bore 58 as a hydraulic cushion as well as a source of dynamic resistance, and can be done by modifying cylinder 50 as shown in FIG. 7.

Figure 7:
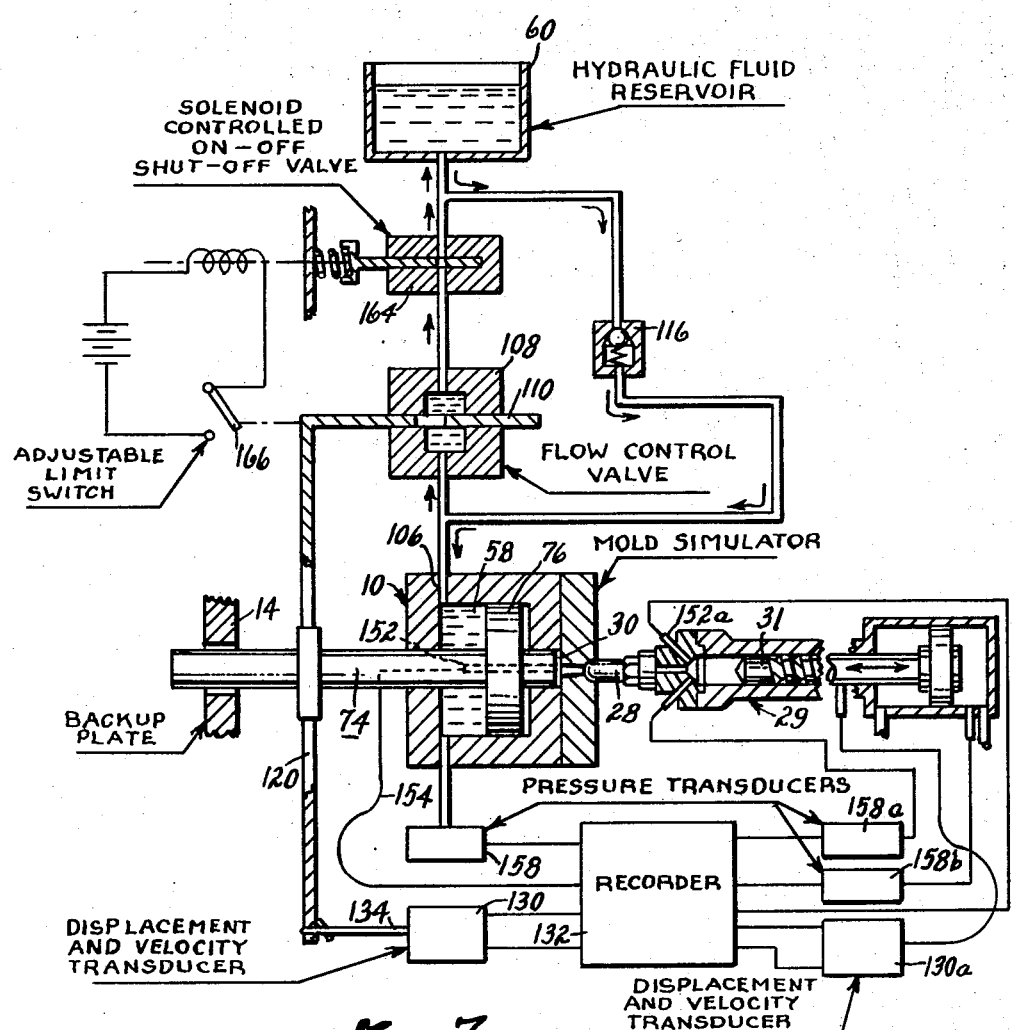
FIG. 7 is a schematic of a modified form of the mold simulator in operation.

FIG. 7 is very similar to FIG. 6 except for the deletion of adjustable stops 162 and the addition of solenoid controlled pilot pressure operated hydraulic shut off valve 164, downstream from flow control valve 108, which can be controlled independently of flow control valve 108. Solenoid controlled shut off valve 164 is in series with flow control valve 108 in the channel leading back to hydraulic reservoir 60. Thus by firing the solenoid in this valve at any desired point in the stroke of stepped piston assembly 74, by means of adjustable limit switch 166 triggered by actuating arm 120, it is possible to stop the travel orf stepped piston assembly 74 while continuing to read the pressure exerted by the melt on piston step portion 76 and hence the hydraulic fluid in cylinder bore 58. It should be noted that this can be arranged such that the travel of stepped piston assembly 74 may be stopped regardless of the position of flow control valve 108 (i.e., at any position from fully open to fully closed).

Herein lies a major advantage of the mold simulator, namely that by controlling the closure of valve 108 and by modifying its characteristics and by measuring the hydraulic fluid pressure within cylinder bore 58 it is possible to produce a great variety of known conditions of resistance to filling a mold of a plastic injection molding machine and this without the necessity of making several mold changes. In addition, by simultaneously recording the motion of stepped piston assembly 74 through a suitable connection, such as by cable 134, to position and velocity transducer 130 and the use of a suitable recording system 132, the mold simulator also provides an accurate record of how such changes in mold filling resistance affect the flow rate of melt into the mold simulator or in other words, the delivery of plasticized material of the particular injection machine under test.

Development of the mold simulator has made possible the discovery of a method for quantitatively studying the capability and performance of the injection system of an injection molding machine by concurrently allowing (1) measuring and recording the temperature of the material injected into the mold simulator cavity while simultaneously measuring and recording the temperature of the material upstream of the injection nozzle; (2) measuring and recording the pressure of the hydraulic fluid being displaced from the mold simulator cavity while simultaneously measuring and recording the melt and hydraulic injection pressures in the injection system; and (3) measuring and recording the position and velocity of the mold simulator piston during its movement while simultaneously measuring and recording the position and velocity of the injection system actuating means.

Thus by use of the mold simulator, the performance of the injection machine's injection system may be quantitatively studied under a great variety of conditions which parallel those it will encounter when running a large variety of molds under various conditions without the need to actually run a large number of experiments on molds. In addition it provides a means for quantitatively measuring the actual load on the injection means which is often impossible when running actual molds because of the difficulties encountered in properly instrumenting them for such tests.

While this invention has been described in connection with possible forms or embodiment thereof, it is to be understood that the present disclosure is illustrative rather than restrictive and that changes or modifications may be resorted to without departing from the spirit of invention or scope of the claims which follow.

What is claimed is:

1. A mold simulator for mounting between fixed and moving platens of an injection molding machine of the type having an injection system with means for injecting shots of plasticized material through a nozzle during an injection stroke, said simulator comprising in combination:
   (a) a sprue plate attached to the fixed platen and having a sprue bushing in communication with the nozzle;
   (b) a mold cavity plate movingly connected with the sprue plate and having a central opening therein in communication with the sprue bushing;
   (c) a cylinder having a bore, an open end and an apertured end, with the open end being attached to the mold cavity plate;
   (d) a stepped piston assembly having a first end portion extending from the apertured end of the cylinder, a second end portion extending into, and in one position being capable of substantially completely filling the mold cavity plate central opening, and a stepped central portion confined within the cylinder bore, with the piston assembly being capable of sealingly sliding movement with respect to the mold cavity plate and the cylinder;
   (e) at least one support member situated between and fixedly secured to the cylinder and the moving platen;
   (f) an adjustable flow control valve having a control member, said valve being attached to the cylinder and operatively connected with the cylinder bore;
   (g) a source of fluid connected with the cylinder bore and the flow control valve;
   (h) adjustable means connected to the flow control valve and the stepped piston first portion to regulate the closure of the flow control valve as a function of the position of the piston assembly relative to the cylinder;
   (i) means for measuring and recording the position and velocity of the piston assembly, relative to the cylinder, operatively connected with the stepped piston first end portion;
   (j) means for measuring and recording pressure within the cylinder bore operatively connected with the cylinder bore; and
   (k) means for measuring and recording the temperature of the plasticized material, injected against the end face of the stepped piston second portion, operatively connected with the piston second end portion, whereby injecting plasticized material against the end face of the stepped piston second end portion simulates mold operation by forcing the piston assembly to slide relative to the cylinder thereby producing a variable volume mold cavity in the mold cavity plate central opening, with the sliding of the piston assembly being opposed by the fluid in the cylinder bore, the escape of the fluid through the flow control valve being regulated by the adjustable means connected thereto as a function of the position of the piston assembly, with the pressure in the cylinder bore, the position and velocity of the piston assembly and the temperature of the injected material all being simultaneously measured and recorded as the plasticized material is being injected.

2. The mold simulator of claim 1 wherein the adjustable means connected to the flow control valve and the stepped piston first end portion for regulating the flow control valve as a function of the position of the piston assembly comprises:
   (a) an actuating arm having one end mounted on the stepped piston first end portion;
   (b) a rack having one end adjustably attached to the other end of the actuating arm and the other end extending slightly beyound the flow control valve; and
   (c) a replaceable pinion attached to the control member of the flow control valve and operatively meshing with the rack, whereby by properly controlling the travel of the control member, as a function of the position of the piston assembly relative to the cylinder, said control member may be traversed through any one of several injection strokes of preselected any one of several injection strokes of preselected lengths in accordance with the pinion-and-rack combination selected.

3. The mold simulator of claim 2 wherein the control member of said flow-control valve comprises a changeable orifice serving to provide adjustable valve characteristics, whereby by properly controlling the travel, shape and size of the orifice it is possible to produce virtually any program of valve resistance and hence any program of opposing pressure within the cylinder cavity to resist the movement of the piston assembly relative to the cylinder as a function of the position of the piston assembly during the injection cycle of the injection molding machine.

4. The mold simulator of claim 1 further including:
   (a) a piston extension attached to the first end portion of the stepped piston assembly and having a flange portion;
   (b) at least one stop member interposed between the moving platen of the injection molding machine and the piston extension flange portion, whereby upon insertion of the desired size stop member the motion of the stepped piston assembly may be positively stopped at any point in its travel regardless of the resistance to the flow of fluid from the cylinder bore at that particular point in the cycle thereby simulating the difference between the injection of small and large shots of plasticized material in small and large volume molds which present various resistances to filling.

5. The mold simulator as defined in claim 1 further including an adjustably actuatable shut-off valve interposed between the source of fluid and the flow control valve, whereby upon closing of the shut-off valve the motion of the stepped piston assembly may be stopped at any point in its travel, regardless of the resistance to the flow of fluid from the cylinder bore offered by the flow control valve at that particular moment.

6. The mold simulator of claim 5 wherein the shut-off valve is controlled by an adjustable switch actuated by the adjustable means connected to the flow control valve and the stepped piston first end portion thereby regulating the shut-off valve as a function of the position of the piston assembly.

7. An apparatus mounted between fixed and moving platens of an injection molding machine, of the type having an injection system with fluid pressure actuating means for injecting shots of plasticized material during an injection stroke through a nozzle into a mold cavity, for quantitatively studying the capability and performance of the injection means, comprising in combination:
   (a) a mold simulator including
      (1) a chamber,
      (2) a displacement member within the chamber, with the chamber and the displacement member being relatively movable with respect to each other and thereby defining two variable volume cavities,
      (3) a source of fluid connected to one of the cavities, the other of the cavities communicating with the nozzle;
   (b) means for measuring and recording the temperature of the material injected into the other of the cavities from the nozzle while simultaneously measuring and recording the temperature of the material upstream of the nozzle;
   (c) means for measuring and recording the pressure of the fluid being displaced from the one cavity while simultaneously measuring and recording the pressure of the plasticized material in the injection system and the fluid pressure in the injection system actuating means; and
   (d) means for measuring and recording the position and velocity between the chamber and the displacement member while simultaneously measuring and recording the position and velocity of the injection system actuating means.

8. The apparatus of claim 7 including an adjustable flow control means attached to the mold simulator for adjustably opposing the displacement of the fluid from the one cavity.

9. The apparatus of claim 7 including an adjustable flow control means attached to the mold simulator for adjustably opposing the displacement of the fluid as a function of the relative movement between the chamber and the displacement member.

10. The apparatus of claim 9 including an adjustable shut-off valve attached to the flow control means for adjustably stopping the displacement of the fluid from the one cavity regardless of the resistance to the flow of fluid offered by the flow control means.

References Cited
UNITED STATES PATENTS

| 3,270,383 | 9/1966 | Hall et al. | 18—30 |
| 3,492,700 | 2/1970 | Kornmayer | 18—2 |

FOREIGN PATENTS

| 1,355,774 | 2/1964 | France |
| 747,862 | 4/1956 | Great Britain. |

J. SPENCER OVERHOLSER, Primary Examiner

M. O. SUTTON, Assistant Examiner

U.S. Cl. X.R.

18—2; 73—432